L. B. BENTON.
APPARATUS FOR CUTTING MATRICES.
APPLICATION FILED OCT. 13, 1909.
1,068,478.
Patented July 29, 1913.
3 SHEETS—SHEET 1.
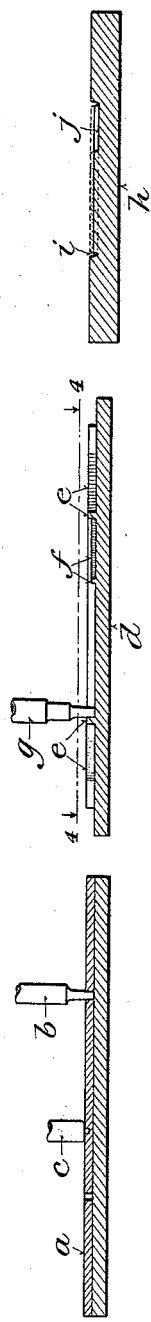
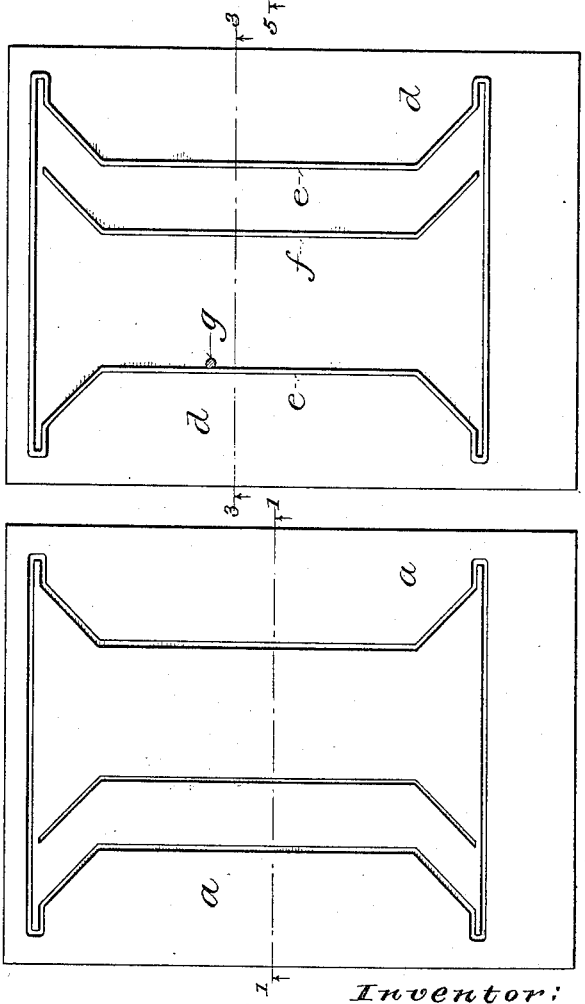

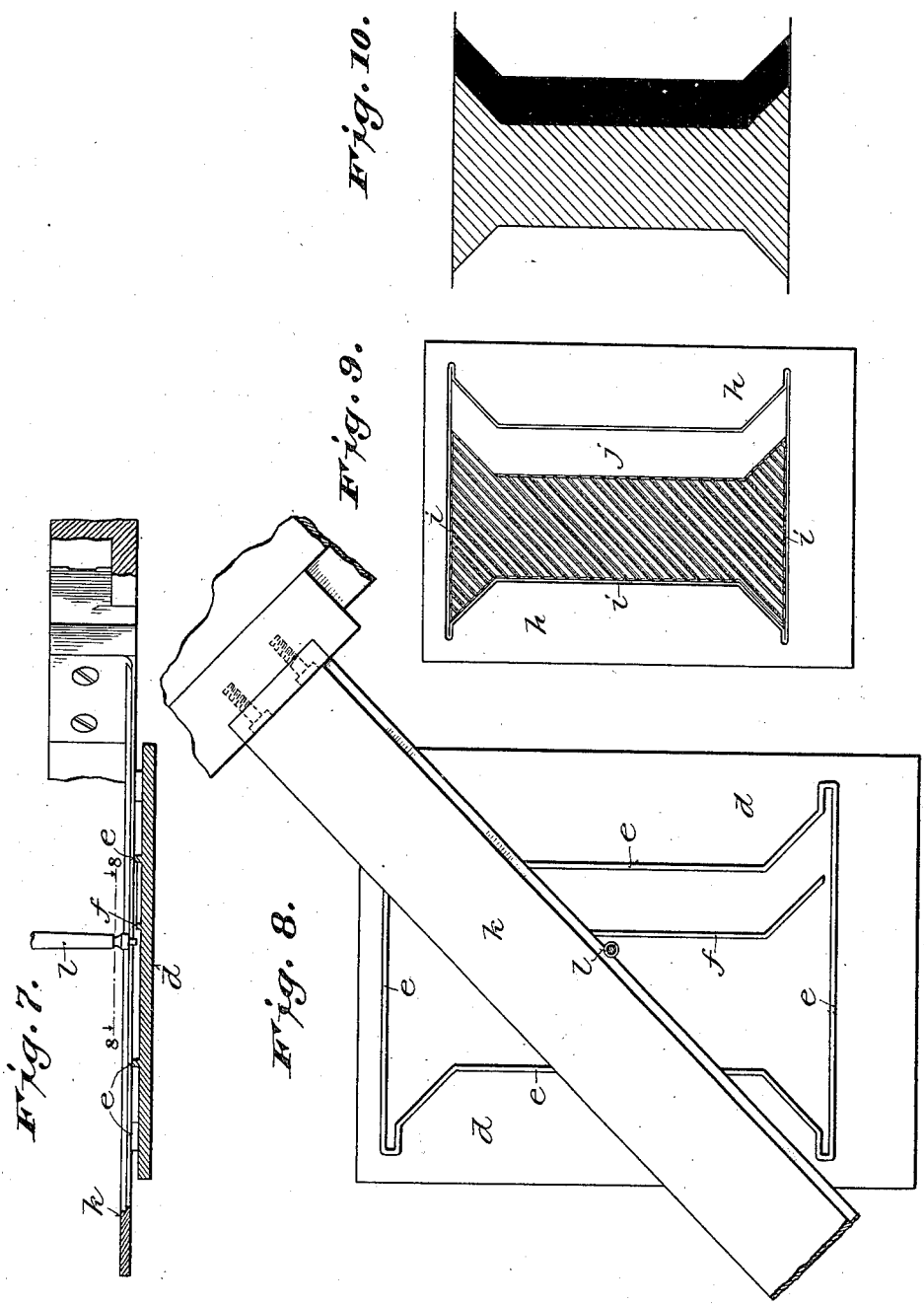

L. B. BENTON.
APPARATUS FOR CUTTING MATRICES.
APPLICATION FILED OCT. 13, 1909.
1,068,478.
Patented July 29, 1913.
3 SHEETS—SHEET 3.
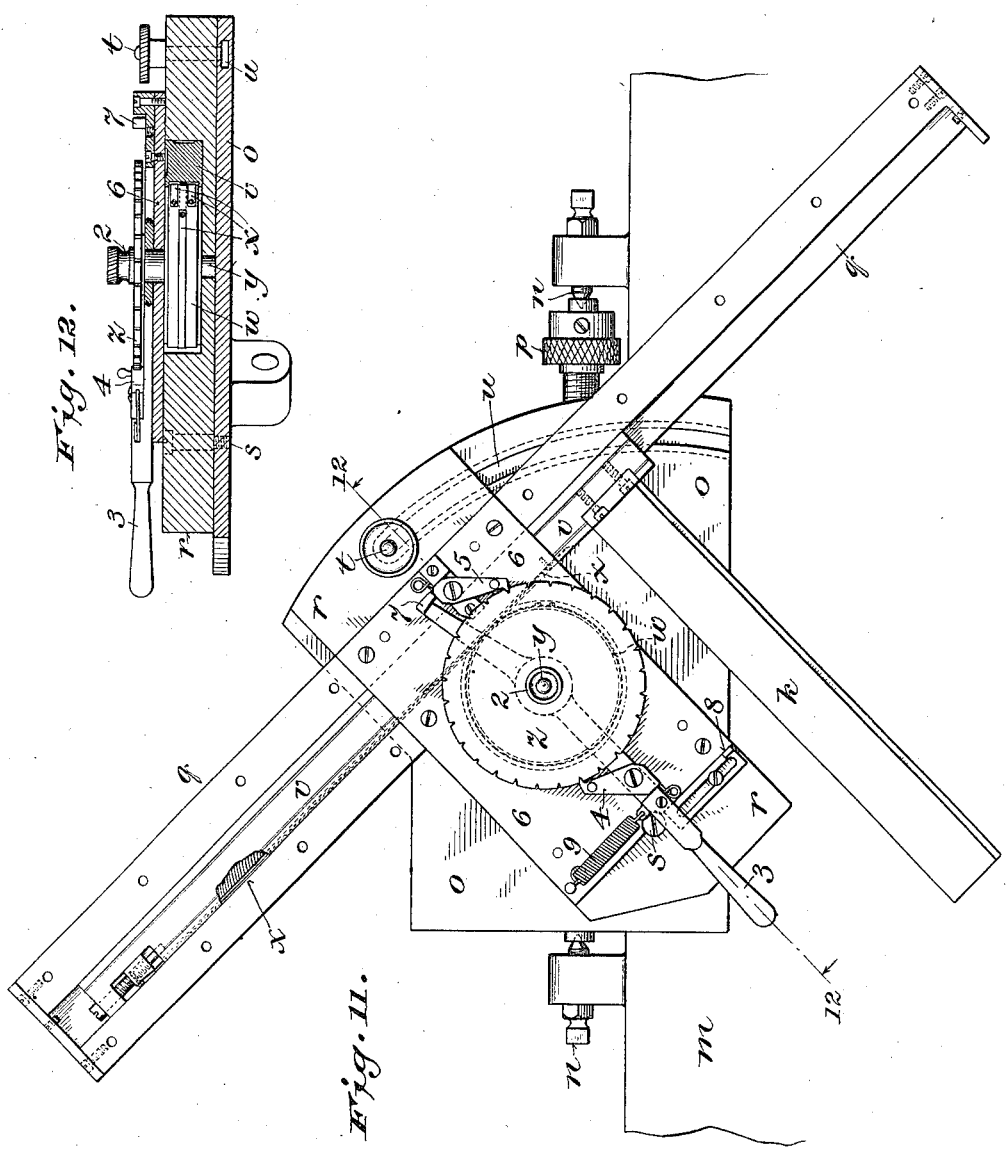

UNITED STATES PATENT OFFICE.

LINN BOYD BENTON, OF PLAINFIELD, NEW JERSEY, ASSIGNOR TO AMERICAN TYPE FOUNDERS COMPANY, OF JERSEY CITY, NEW JERSEY, A CORPORATION OF NEW JERSEY.

APPARATUS FOR CUTTING MATRICES.

1,068,478.  Specification of Letters Patent.  Patented July 29, 1913.

Application filed October 13, 1909. Serial No. 522,416.

*To all whom it may concern:*

Be it known that I, LINN BOYD BENTON, a citizen of the United States, residing at Plainfield, in the county of Union and State of New Jersey, have invented certain new and useful Improvements in Apparatus for Cutting Matrices, of which the following is a specification, reference being had to the accompanying drawing, forming a part thereof.

This invention relates more particularly to means for cutting matrices to make type, or casts for printing shaded characters or designs.

The main object of the invention is greater facility and accuracy in the production of this class of work.

It consists in the construction, arrangement and combination of parts as hereinafter particularly described and pointed out in the claims.

In the accompanying drawing showing apparatus embodying the present invention and illustrating the method of and devices for producing the pattern or form, like characters designate the same parts in the several figures.

Figure 1 is a cross section on the line 1 1, Fig. 2, showing a grooved wax tablet for making a raised pattern or form, and styles for producing the grooves and tracing the counterpart of the raised pattern or form in the wax; Fig. 2 is a plan or face view of the tablet as made to produce a pattern for cutting a matrix for a shaded capital letter "I"; Fig. 3 is a cross section on the line 3 3, Fig. 4, of a form or pattern made from the wax tablet shown by Figs. 1 and 2, in connection with a follower for guiding the cutting tool of the matrix engraving machine; Fig. 4 is a plan or face view of the pattern and cross section of the follower on the line 4 4, Fig. 3; Fig. 5 is a cross section on the line 5 5, Fig. 6, of one form of matrix which may be cut with a tool guided by the pattern or form shown by Figs. 3 and 4; Fig. 6 is a face or plan view of the matrix; Fig. 7 is a cross section similar to Fig. 3, in connection with portions of a movable guide and a follower for directing the movements of a tool for cutting grooves in the matrix to produce raised shade lines on the face of a type or cast made with the matrix; Fig. 8 is a plan view of the parts shown by Fig. 7, the follower being shown in cross section on the line 8 8, Fig. 7; Fig. 9 is a plan view of a matrix like that shown by Figs. 5 and 6, having grooves cut therein to produce type or casts with raised shade lines; Fig. 10 shows the impression of a type made with the matrix shown by Fig. 9; Fig. 11 is a plan view showing mechanism suitable for adjusting and operating the movable guide; and Fig. 12 is a vertical section on the line 12 12, Fig. 11.

To produce the pattern or form, an enlarged drawing of the desired character or design is made, as for example, a shaded capital I. With a pantograph or similar instrument (not shown) the lines of the drawing are traced in a wax tablet $a$, as shown in Fig. 1, a style $b$ for making a deep groove in the wax being used for the outline, and a style $c$ for making a similar but shallower groove being used for the shade defining line within the main outline.

The style $c$ is formed next to its point or tip with a shoulder which is held against the face of the wax and determines the depth of the groove made by the point or tip. In tracing the character or design in the wax, the shallower groove or grooves made by the style $c$ are preferably formed first, and made to terminate as shown in Fig. 2, a short distance from the deeper groove forming the main outline produced by the style $b$, to permit the follower used in the matrix engraving machine with the pattern or form made from the wax tablet, to pass the ends of the low ridge or abutment in cutting the main outline of the matrix, as hereinafter explained.

After the character or design has been traced as above stated in the wax, the tablet is coated with powdered graphite or a similar electrical conducting substance, and a film of copper deposited thereon electrolytically. This film is then backed with a suitable thickness of metal, such as type metal, thus producing therewith the pattern or form $d$, as shown in Figs. 3 and 4, having a raised ridge, shoulder or abutment $e$, corresponding with the deeper groove in the wax tablet and with the main outline of the character or design to be produced in the matrix, and a ridge, shoulder or abutment $f$, of less height, corresponding with the shallower groove in the wax tablet and with the shade defining line of the character or design.

The pattern or form *d* being secured in place in the engraving machine, the operator moves the follower *g*, which is connected with the movable cutting tool of the machine, along the entire circuit or length of the ridge or shoulder *e* in constant and close contact therewith, as shown in Fig. 3, thus producing a similar movement of said tool and causing it to cut in the matrix blank or block *h* which is held stationary in the machine, a groove *i*, as shown by Figs. 5 and 6, corresponding with the outline of the character or design of the pattern as defined by said ridge or shoulder *e*. In this operation the follower *g* passes freely through the openings or spaces between the ridge or shoulder *e* and the ends of the ridge or shoulder *f*, thus avoiding any break in the continuity of the groove *i*, defining the outline of the character or design in the matrix.

With the same pattern or form matrices may be cut for characters or designs having several styles of faces, for example, a heavy shade in solid color on one side of a plain or blank face, a face of solid color with a plain or blank face bounded by a marginal line in place of the solid shade, or in place of either of such plain faces, a face having shade lines of any desired kind, heavy or light, straight, curved or zigzag, horizontal, perpendicular or oblique, etc.

In the example selected for illustration, the metal of the block *h* is cut away to form a wide groove or channel *j* of the same depth as the groove *i*, as shown in Figs. 5 and 6, by causing the follower *g* to traverse the whole area of the space between the shoulder or abutment *e* on the right hand side of the pattern or form *d* and the ridge or shoulder *f*. A follower and tool of larger diameter may be used in removing the metal to form the groove or channel *j*, or any extended cavity in the matrix for producing a corresponding printing face on the cast taken therefrom. The raised portion of the matrix thus left between and surrounded by the grooves *i* and *j* is preferably cut down, as indicated by dotted hatching in Fig. 5, if the corresponding face of the cast is to have shade lines, so that the tool employed to cut the grooves in the matrix for producing such lines on the cast will have less material to remove, and hence a finer tool may be used and the shade lines may be made closer together. The grooves in the matrix for producing such shade lines are made as follows: A rule or guide *k* connected in any suitable manner with the machine, is adapted to be moved laterally step by step, predetermined intervals, across or over the pattern *d* upon which it rests, when the pattern is secured in place and the parts are properly adjusted for operation in connection with the matrix engraving machine. The guide is also capable of angular adjustment relative to the pattern when held in place in the machine, so as to cut the grooves in the matrix for making shade lines in any desired direction, horizontal, vertical, or at any angle or inclination.

Mechanism like or similar to that of a section liner may be employed to move the guide laterally step by step and to adjust and determine the intervals of such movement. Referring to Figs. 11 and 12 showing mechanism suitable for the purpose, *m* designates the bed of the engraving machine on which the pattern *d* is held. It is provided on the rear side with cone pointed screws *n* on which a plate *o* is pivotally mounted. This plate is adjustable crosswise of the bed and lengthwise of the pivot screws *n* by means of screw *p*. A channeled guide bar *q* having a transverse plate or offset *r*, is connected with the plate *o* by a pivot screw *s*, and is fastened in adjusted position by a screw *t* passing loosely through a hole in the plate *r* and provided with a clamping nut and with a head working in a curved undercut groove *u* formed in the plate *o* concentric with the pivot screw *s*. The rule or guide *k* is attached at one end to a bar *v* fitted to slide lengthwise in the channel of the guide bar *q*. A rotary drum *w*, mounted in a recess of the plate *r* intersecting the channel in the guide bar *q*, is connected by belts *x* with opposite ends of the sliding bar *v*. On the spindle *y* of the drum *w*, is removably fitted a notched index or spacing wheel *z* and fastened by a nut 2. Interchangeable index or spacing wheels having different numbers of notches are provided to cut grooves in matrices for producing shade lines on the casts taken from such matrices different distances apart. A lever 3 fulcrumed on the spindle *y*, is provided with a pivoted dog 4 which is held by a spring in yielding engagement with the notched periphery of the index wheel *z* and is adapted when said lever is oscillated, to turn said wheel and move the rule or guide *k* laterally, step by step, predetermined intervals corresponding with the spacing of the notches of said wheel and the throw of said lever. A pivoted dog 5 mounted on the cap plate 6 which covers the drum *w*, and held by a spring in yielding engagement with the notched periphery of the index wheel *z*, coöperates with a projection 7 of the lever 3, to limit the advance movement of the index wheel with said lever and to prevent overthrow and backward movement of said wheel. The backward movement of the lever 3 is limited by an adjustable back stop 8 mounted on the cap plate 6. A spring 9 tending to throw the lever 3 forward, holds the projection 7 thereon normally in engagement with the dog 5. The rule or guide *k* is adjusted bodily with its supporting and actuating connections transversely to the bed $m$ by the screw $p$. Its inclination or angle with relation to the bed and pattern is varied by turning the plate $r$ with relation to the plate $o$ on the pivot screw $s$ and fastening it in adjusted position by the clamping nut on the screw $t$. A step by step lateral movement of the rule or guide $k$ toward the plate $o$ is produced by drawing the lever backward against the stop 8 and releasing it, whereupon the spring 9 throws it forward, its forward movement being arrested by the engagement of the projection 7 with the dog 5. The rule or guide $k$ is reset by drawing it away from the plate $o$, the dogs 4 and 5 being thrown out of engagement with the index wheel $z$.

As shown in Figs. 7 and 8, a follower $l$, connected with the groove-cutting tool of the engraving machine, has a tracing point or projection adapted to engage with one edge of the guide $k$, and a shoulder adapted to bear on the upper face of said guide and to carry said point or projection in such position with relation to the pattern $d$, that it will just clear and pass over the ridge or abutment $f$, but will engage with and its movement will be limited by the higher ridge or shoulder $e$, thus preventing the groove-cutting tool from passing the outline of the matrix cavity as defined by the groove $i$ or by the grooves $i$ and $j$. The follower $l$ being moved by the operator back and forth along the guide $k$ in close and constant contact therewith and the guide being advanced laterally an interval after each movement of the follower from the ridge or shoulder $e$ at one side or end of the pattern to said ridge or shoulder at the opposite side or end, causes the tool to cut a series of parallel grooves in the raised part of the matrix cavity to the depth of the groove $i$, as indicated by a dotted line in Fig. 5 and shown in plan by full lines in Fig. 9. In case the shoulder or abutment $f$ were omitted from the pattern $d$, and a simple groove of uniform width, such as the groove $i$, were cut in the matrix to define the outline of the character or design, grooves for shade lines could be cut in like manner, extending completely across the matrix cavity from the marginal groove $i$ on one side or end thereof to the same groove on the opposite side or end.

The working edge of the guide $k$ which may have any desired shape, straight, curved, wavy, zigzag, etc., is preferably reduced in thickness as shown in Figs. 7 and 8, to correspondingly reduce the length of the tracing point or projection of the follower $l$.

With the movable rule or guide $k$, the same raised pattern $d$ may be used for cutting matrices for a complete series of shaded letters, characters or designs, the lateral movement of the rule or guide being increased for the smaller sizes of the series so that the spacing of the shade grooves in the matrices and of the shade lines on the type or casts made therefrom will be the same or approximately the same for the entire series. It follows, of course, that the smaller sizes of the series will have fewer shade grooves or lines than the larger sizes. Thus, it will be apparent, that the necessity of multiplying patterns for the several sizes of a series is obviated, and at the same time, a single pattern serves to produce matrices for characters or designs shaded in various ways as hereinbefore explained.

For greater clearness of illustration, Figs. 5, 6 and 9, showing a matrix, and Fig. 10 showing an impression of a type made from the matrix are drawn on a relatively larger scale than Figs. 1, 2, 3, 4, 7 and 8, showing the wax tablet and the pattern made therefrom, the reduction in size from pattern to matrix being in practice ordinarily greater than that shown by the drawing.

I claim:

1. In apparatus for cutting matrices for shaded faces, a pattern or form having a raised shoulder or abutment for determining the outline or contour of the matrix cavity, and a shoulder or abutment of less height for determining the limit of the shaded face within said cavity.

2. In apparatus for cutting matrices for shaded faces, the combination of a pattern or form having an outline-defining shoulder or abutment, a stationary support for said pattern or form, a follower-guide movable in parallelism across the pattern or form and means for moving the follower guide laterally step by step.

3. In apparatus for cutting matrices for shaded faces, the combination of a pattern or form having an outline-defining shoulder or abutment, a stationary support for said pattern or form, a follower guide movable in parallelism step by step predetermined intervals across said pattern or form and capable of angular adjustment and means for moving the follower guide step by step across the pattern.

4. In apparatus for cutting matrices for shaded faces, the combination of a pattern or form having an outline-defining shoulder or abutment, a stationary support for said pattern or form, a follower-guide adapted to be moved laterally step by step predetermined intervals over the face of the form and means for moving the follower guide laterally step by step.

5. In apparatus for cutting matrices for shaded faces, the combination of a pattern or form having an outline-defining shoulder or abutment and a shoulder or abutment of less height for defining the limit of the shaded face within the matrix cavity, a stationary support for said pattern or form, a follower-guide movable step by step predetermined intervals laterally across the face of the pattern or form and means for moving the follower guide laterally step by step.

6. In apparatus for cutting matrices for shaded faces, the combination of a pattern or form having a raised outline-defining shoulder or abutment and a shoulder or abutment of less height for defining the limit of the shaded face within the matrix cavity, a stationary support for said pattern or form, a follower-guide movable step by step predetermined intervals across the said pattern or form and capable of angular adjustment relative thereto and means for moving the follower guide step by step across the pattern.

7. In apparatus for cutting matrices for shaded faces, the combination of a pattern or form having a raised outline-defining shoulder or abutment and a shoulder or abutment of less height for defining the limit of the shaded face within the matrix cavity, a follower guide movable laterally step by step predetermined intervals across the pattern and means for moving the follower guide laterally step by step.

8. In apparatus for cutting matrices for shaded faces, the combination of a pattern or form having a raised outline-defining shoulder or abutment and an intermediate shoulder or abutment of less height for defining the limit of the shaded face within the matrix cavity, a follower-guide movable laterally over the pattern or form, a follower having a reduced tracing point and a shoulder adapted to rest on said guide and to support said point in position to clear said intermediate shoulder or abutment and means for moving the follower guide laterally step by step.

In witness whereof I hereto affix my signature in presence of two witnesses.

LINN BOYD BENTON.

Witnesses:
 CHAS. L. GOSS,
 ALICE E. GOSS.

---

Copies of this patent may be obtained for five cents each, by addressing the "Commissioner of Patents, Washington, D. C."